March 29, 1966  E. M. ADAMS  3,242,543
MOLDING CLIP
Filed March 5, 1964
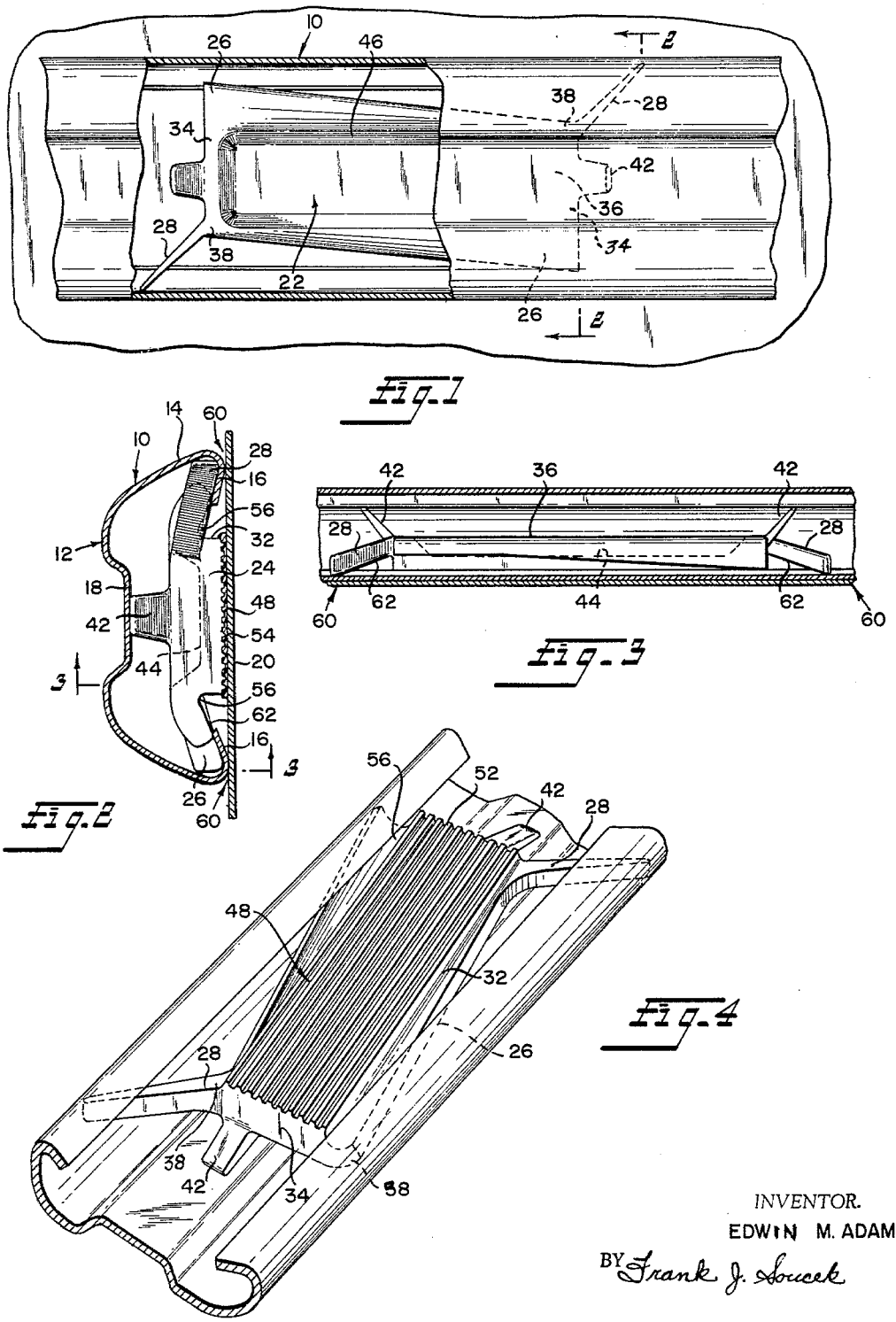
INVENTOR.
EDWIN M. ADAMS
BY Frank J. Soucek United States Patent Office 3,242,543
Patented Mar. 29, 1966

3,242,543
MOLDING CLIP
Edwin M. Adams, Royal Oak, Mich., assignor to General Motors Corporation, Detroit, Mich., a corporation of Delaware
Filed Mar. 5, 1964, Ser. No. 349,609
5 Claims. (Cl. 24—73)

This invention relates to molding fasteners and more particularly to a plastic molding clip to secure a molding strip on a supporting panel and adapted to be cemented on the panel surface.

Application of decorative molding strips is widely used on vehicle body surfaces to cover up panel joints and to add aesthetic appeal to the product. The molding strips are mounted in various positions on the vehicle body and it is necessary to use a clip which is inexpensive and also simple in assembly. It is also necessary that the molding clip be adaptable to various molding strip designs.

Previous methods of securing a molding clip to vehicle bodies include inserting various types of studs or resilient tabs through apertures in the body panel. Although a standard panel piece may be utilized on a particular motor vehicle, various styling models may require that the molding strip be placed at various locations or omitted. When a molding strip is secured to a panel aperture and the locations of the apertures vary because of different strip positions, additional handling and assembly of the various models are required. In the installation of a molding strip fastener assembly to a panel aperture, paint around the aperture may become chipped, leaving bare metal exposed to weather for a starting point of rust and corrosion. The plastic molding clip which is the subject of the present invention and which is described below secures the molding strip without the use of an aperture in the supporting panel.

In addition, a primary feature of the subject clip is to eliminate the need for providing the generally required clip loading notches in the molding strip. Generally, molding retention clips can only be inserted into the molding strip at the location of such a loading notch. They then must be slidably moved several inches to a pre-determined point along the strip for engagement with a body panel aperture. The subject clip, however, may be installed at any point along the molding without the need of loading notches, thereby saving the extra time and effort required in assembling conventional clips and moldings.

The device in which this invention is embodied comprises generally a plastic molding clip made of nylon, polyurethane or any other suitable plastic material and includes a body member which is receivable within a molding strip and which has a plurality of projections to clamp the body to the molding strip. The body portion also includes a surface which is adapted to be cemented to a panel surface. The projections extend generally horizontally from the sides of the body member and include oppositely disposed wing and arm members to retain the molding strip. Upwardly extending body tabs force the molding strip against the wing and arm members, thereby clamping the molding clip within the molding strip. The clip may be secured to the molding strip before use, thereby simplifying transportation and assembly procedures.

The plastic molding clip of this invention provides an inexpensive plastic fastener which is adaptable to any type of generally C-shaped molding strip and is relatively simple to manufacture and assemble. Securing the clip to a panel surface by means of cement eliminates the requirement of panel apertures or other substantial alteration or preparation of the panel surface.

An object of the present invention is the provision of a plastic molding clip to readily and securely mount a molding strip upon a supporting panel surface.

Another object is to provide a plastic molding clip that is receivable within a molding strip and attachable to a surface by means of an adhesive applied to the clip.

A further object of the invention is the provision of a plastic molding clip having a plurality of projections, cooperatively coacting to resiliently clamp the body to the molding strip and thereby attach the strip to any surface to which the clip is affixed.

Further objects and advantages of this invention will become apparent from the following description of the annexed drawing which illustrates a preferred embodiment. It will be understood that the invention herein disclosed may be employed for other purposes for which the part, structure, and arrangement are adapted. In the accompanying drawing:

FIGURE 1 is a top view of a molding strip installation with a part of the molding strip broken away, showing the molding clip device of the present invention securing a molding strip to a supporting panel.

FIGURE 2 is a cross section of the structure shown in FIGURE 1 taken along line 2—2 thereof and looking in the direction of the arrows.

FIGURE 3 is a cross section of the structure shown in FIGURE 2 taken along line 3—3 thereof and looking in the direction of the arrows.

FIGURE 4 is a perspective view of the plastic molding clip of the present invention mounted within a molding strip.

Referring more particularly to the drawing, FIGURES 1 through 3 illustrate the installation of a molding strip to a supporting panel by means of the plastic molding clip of this invention. The molding strip 10 is generally C-shaped in cross section and includes a main portion 12, side edges 14, and inturned flanges 16 extending inwardly from the side edges. The main portion 12 of the molding strip is shown including the longitudinal recessed channel 18 which is provided to increase the bending strength and for aesthetic appeal.

The supporting panel 20, which may be a motor vehicle panel or any other panel, provides a mounting surface to which the strip is to be attached.

The molding clip 22 includes a substantially rectangular shaped body member 24 having separate pairs of wing members 26 and arm members 28, respectively, extending from the sides 32 and ends 34 thereof. These wing members 26 and arm members 28 are also inclined downwardly from the top 36 of the body 24, as best seen in FIGURES 2 and 3. The arm members 28 project outwardly from the ends of the body at two diagonally opposite corners 38. Extending upwardly from the opposite ends 34 of the body member are tab members 42.

The body member 24 has its sides 32 and ends 34 flanged upwardly to form a generally rectangular recess 44 in its top 36, thereby providing rib-like walls 46 which add strength and rigidity to the body member. The back side 48 of the body member 24 is provided with serrations 52 or other surface indentations suitable to form a roughened face for the application of an adhesive 54. The back surface 48 may be flat or curved to conform to the surface contour of supporting panel 20.

Each of the arm members 28 is shown horizontally extending from diagonally opposite corners 38 of the body member and at an angle to the body sides 32. The arm members are resilient and are arranged to engage the side edges 14 and inturned flanges 16 of the molding strip 10 upon insertion within the strip. A horizontally extending arm 28 is shown in the drawings disposed at each end 34 of the body member 24, on the opposite side thereof from a wide portion 58 of a wing member 26, and thereby providing a supporting arrangement at both sides 32 for each body end 34. The underside 62 of each arm member 28 receives the inturned flange 16 of the molding strip 10 and is arranged, as are the wing members, to hold the molding strip inturned flange in abutment 60 with the panel surface as discussed above.

In application of the molding clip to the molding strip, either end of the clip is aligned with an end of the strip and the molding clip members are sequentially inserted therein as next described. The arm member of the inserted end engages one side edge of the molding strip and is forced against the associated inturned flange. As the clip is further inserted, the upward extending clip tab engages the underside of the main portion of the molding strip. The wing member associated with the opposite side edge slides on the associated inturned flange. When the tab member at the trailing end of the clip resiliently engages the main portion, the trailing wing member will have engaged the strip and will have been forced by the tab against the inturned flange in which it is received. The clip is finally received within the molding strip when the remaining arm member resiliently bends to engage the side edge initially engaged by the wing member at the opposite clip end. The resilient arm and tab members and substantially non-resilient wing members cooperatively coact to resiliently clamp the molding clip 22 to the strip 10. The wing members 26 and the arm members 28 both engage the inturned flanges 16 and prevent the strip from being pulled out from the back or panel mounting side of the molding strip. An appropriate adhesive 54, such as a conventional epoxy or other cement, is applied directly to the back side 48 of the body member 24 or at a point on the supporting panel 20 where the body member molding clip is to be secured. It is obvious that the molding clip may be mounted first on the supporting panel member prior to having the molding strip installed over the molding clip in the manner described above for receiving the molding clip within the molding strip.

With the clip member in place on the supporting panel, the strip is clamped and supported between the supporting panel 20 and the molding clip wing and arm members, thereby securing the strip from being pulled away from the supporting panel or displaced laterally by forces acting at the sides of the molding strip. The resilient tab and arm members facilitate insertion of the clip within the molding strip and also provide clamping means to clamp the clip within the molding strip by forcing the molding strip away from the body 24 of the molding clip. The substantially non-resilient wing members provide additional strength and resistance to withstand forces tending to displace the molding strip after the molding clip is secured in place.

The molding clip described herein securely retains a molding strip on a supporting panel and may be mounted on the supporting panel by simple application of a conventional adhesive. The plastic material used in the manufacture of the molding clip may be a nylon or polyurethane or any other suitable plastic known and utilized in plastic fasteners of this type. The above described molding clip is adaptable for a wide variety of molding strip configurations due to the resiliency and configuration of the depending members which can be easily modified in manufacture by a molding process.

It should be understood that the foregoing disclosure relates only to a preferred embodiment of the invention and is intended to cover all changes and modifications of the invention herein described which do not constitute departures from the spirit and scope of the invention.

I claim:

1. A plastic molding clip for securing a generally C-shaped molding strip to a supporting panel; said molding strip having a main portion and side edges terminating in inturned flanges; said molding clip comprising a body member receivable within said molding strip; said body member having a pair of resilient arm members and a pair of non-resilient wing members projecting substantially horizontally from said body member and a pair of tab members extending generally upwardly from said body member; said resilient arm members being adapted to resiliently engage said side edges, with the undersides of said arm members being adapted to engage the inner surfaces of the inturned flanges of said molding strip; said wing members each being adapted to engage said side edges upon bending of the resilient arms and to receive the inner surfaces of said inturned flanges along the sides of said wing member; and said pair of tab members being adapted to engage the main portion of said molding strip at two separate points, thereby urging engagement of said pairs of wing and arm members against the inner surfaces of said inturned flanges.

2. A plastic molding clip for securing a generally C-shaped molding strip to a supporting panel, said molding strip having a main portion and side edges terminating in inturned flanges, said molding clip comprising a rectangular body member receivable in said molding strip; a pair of wing members, said wing members projecting from the top of said body along opposite sides thereof and extending from one body end to the other end, whereby the widest portion of each wing member is disposed at an opposite body end and is adapted to engage the side edges and inturned flanges of said molding strip; a pair of resilient arm members, said arm members horizontally extending from diagonally opposite corners of said rectangular body member, and being adapted to resiliently engage opposite side edges of said molding strip, whereby each arm member urges a side edge toward engagement with a wing member and the other arm member; and a pair of upwardly disposed resilient tab members, said tab members extending from the top of said body member at opposite ends thereof and being adapted to resiliently engage said molding strip main portion, thereby urging said inturned flanges toward engagement with said arm and wing members; the cooperatively coacting pairs of arm, wing and tab members clamping said molding clip to said molding strip.

3. A plastic molding clip for assembly of a strip of molding having inturned flanges along the sides thereof, said molding clip comprising a rectangular body member having a substantially planar back side for fixing said body member to a supporting panel by means of an adhesive and a top side having upwardly projecting ribbed portions along the body sides and ends; integral wing members projecting from the ribbed portions along the body sides; each of said wing members having a recessed channel to receive the inturned flanges of said molding strip, the wing members having wing portions adapted to engage the sides and inturned flanges of said molding strip; integral resilient arm members extending horizontally from the respective ends of said body member at an angle to the sides of said body member and being adapted to resiliently engage ther espective sides of said molding strip, thereby resiliently clamping said molding clip within said molding strip; and tab members extending upwardly from the top side of the body member at opposite ends thereof and being adapted to resiliently engage the molding strip, thereby forcing said inturned flanges into engagement with said wing and arm members and providing further clamping of said molding clip to said molded strip.

4. A plastic molding clip comprising a body member having a top surface and a serrated bottom surface, a pair of side wing members including substantially parallel side edges projecting angularly from opposite body sides, said wing members extending in opposite directions, with each wing member having wide and short horizontally extending portions and being oppositely disposed to the other wing member so that said body ends each include wide and short wing portions along opposite sides thereof, a pair of resilient arm members extending substantially horizontally and outwardly from the short wing portions at the sides of said body ends, said arms having bottom edges substantially coplanar with the bottom edges of said wing members, and tab members extending generally upwardly and outwardly from opposite ends of said body.

5. A plastic molding clip comprising a generally rectangular body member having a first surface and a second surface, said second surface being provided with serrations, a pair of wing members arcuately depending from said first surface toward said second surface of said body along opposite sides thereof, said wing members tapering in opposite directions, with the narrowest portions of said wing members being respectively disposed at diagonally opposite corners of said body, and tab members extending generally outwardly from said first surface adjacent said corners.

References Cited by the Examiner
UNITED STATES PATENTS

| | | | |
|---|---|---|---|
| 2,473,400 | 6/1949 | Waara | 24—73 |
| 2,681,716 | 6/1954 | Black | 52—718 |
| 2,958,108 | 11/1960 | Scott | 24—73 |
| 3,104,739 | 9/1963 | Munse | 24—73 X |
| 3,116,526 | 1/1964 | Cochran | 24—73 |

WILLIAM FELDMAN, *Primary Examiner.*

E. SIMONSEN, *Assistant Examiner.*